United States Patent Office 3,126,415
Patented Mar. 24, 1964

3,126,415
ORGANOBORON COMPOUNDS AND METHOD OF PREPARATION
Joseph Green, Dover, Marvin M. Fein, Westfield, and Nathan Mayes, Dover, N.J., assignors to Thiokol Chemical Corporation, Bristol, Pa., a corporation of Delaware
No Drawing. Filed Nov. 29, 1960, Ser. No. 72,528
11 Claims. (Cl. 260—606.5)

This invention relates to organoboron compounds and to a method for their preparation. The organoboron compounds are prepared by the reaction of an alkali metal with a compound of the class

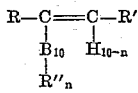

wherein R and R' are each hydrogen, alkyl radicals, or alkenyl radicals, the total number of carbon atoms in R and R' being from 0 to 8, R'' is a lower alkyl radical, and $n$ varies from 0 to 4 while the reactants are in admixture with an inert solvent for the alkali metal.

Compounds of the above class can be prepared by the method described in application Serial No. 59,460, filed September 29, 1960, of Jack Bobinski, Marvin M. Fein and Nathan Mayes. For example, C-isopropenyl-vinylenedecaborane of the formula

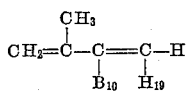

can be prepared by heating isopropenyl acetylene with bis(acetonitrile) decaborane in benzene at reflux for 24 hours.

Suitable alkali metals include sodium, potassium and lithium and solvents for such alkali metals include anhydrous liquid ammonia, methylamine, and tetrahydrofuran for sodium, liquid ammonia, ethylene diamine, aniline and tetrahydrofuran for potassium, and liquid ammonia, methyl- and ethylamines and tetrahydrofuran for lithium.

The ratio of reactants can vary widely, generally being in the range of 2 to 10 moles of alkali metal per mole of organoboron compound. The amount of solvent can vary from 1 to 10 times the amount required to dissolve the alkali metal. The reaction is immediate at ambient conditions.

The process of the invention is illustrated in detail by the following examples:

Example I

To a mixture of 1.6 grams (0.01 mole) of C-methyl-vinylenedecaborane of the formula

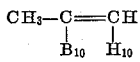

prepared by the reaction of propyne with bis(acetonitrile) decaborane, in about 30 milliliters of liquid ammonia at −33° C. was added, in small portions, a total of 0.14 grams (0.02 mole) of metallic lithium. Upon each addition, the blue color of alkali metal-liquid ammonia solution appeared locally but did not persist until after the last addition. The total time required for addition of the lithium was about 5 minutes, but reaction was immediate. The product was soluble in liquid ammonia and appeared as a white powder when the ammonia was removed by evaporation. The product reacted vigorously with water and ethyl alcohol and decomposed slowly in air. It did not melt below 300° C.

Example II

To a mixture of 6.0 grams (0.032 mole) of C-isopropenylvinylenedecaborane of the formula

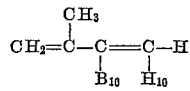

in about 50 milliliters of liquid ammonia at −33° C. was added, in portions, 2.9 grams (0.13 mole) of sodium metal. The blue color appeared upon each addition, but persisted only after the last addition. The total time required for addition of the sodium metal was about 10 minutes, but reaction was immediate. The product was soluble in liquid ammonia and appeared as a yellow powder after removal of the ammonia by evaporation. Again the product reacted vigorously with water and ethyl alcohol and did not melt below 300° C.

The loss of the characteristic vinylenedecaborane stability, coupled with the absence of characteristic vinylenedecaborane absorptions in the infrared spectra, indicate alteration of the vinylenedecaborane structure probably by addition of the metal to the vinylenedecaborane structure itself. In the case of the C-isopropenylvinylenedecaborane, the addition of two moles of alkali metal to the olefinic linkage occurs in the usual way and is accompanied by the addition of two moles of alkali metal to the vinylenedecaborane structure.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the material separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

We claim:

1. A method for the preparation of organoboron compounds which comprises reacting an alkali metal with a compound of the class $$\begin{array}{c} R-C=C-R' \\ | \quad\quad | \\ B_{10} \;\; H_{10-n} \\ | \\ R''_n \end{array}$$

wherein R and R' are each selected from the class consisting of hydrogen, alkyl radicals and alkenyl radicals, the total number of carbon atoms in R and R' being from 2 to 8, R'' is a lower alkyl radical, and $n$ varies from 0 to 4, while the reactants are in admixture with a solvent for the alkali metal.

2. The method of claim 1 wherein the alkali metal is lithium.

3. The method of claim 1 wherein the alkali metal is sodium.

4. The method of claim 1 wherein the said compound is C-methylvinylenedecaborane of the formula $$\begin{array}{c} CH_3-C=CH \\ | \quad\quad | \\ B_{10} \;\; H_{10} \end{array}$$

5. The method of claim 1 wherein the said compound is C-isopropenylvinylenedecaborane of the formula $$\begin{array}{c} CH_3 \\ | \\ CH_2=C-C=C-H \\ | \quad\quad | \\ B_{10} \;\; H_{10} \end{array}$$

6. The method of claim 1 wherein the solvent is liquid ammonia.

7. The method of claim 1 wherein the alkali metal is lithium, wherein the said compound is C-methylvinylenedecaborane of the formula $$\begin{array}{c} CH_3-C=CH \\ | \quad\quad | \\ B_{10} \;\; H_{10} \end{array}$$

and wherein the solvent is liquid ammonia.

8. The method of claim 1 wherein the alkali metal is sodium, wherein the said compound is C-isopropenylvinylenedecaborane of the formula $$\begin{array}{c} CH_3 \\ | \\ CH_2=C-C=C-H \\ | \quad\quad | \\ B_{10} \;\; H_{10} \end{array}$$

and wherein the solvent is liquid ammonia.

9. The products produced by the method of claim 1.
10. The product produced by the method of claim 7.
11. The product produced by the method of claim 8.

No references cited.